United States Patent
Umemoto et al.

(10) Patent No.: US 9,577,504 B2
(45) Date of Patent: Feb. 21, 2017

(54) CRYOGEN SUPPLY AND RETURN DEVICE FOR USE WITH CRYOGEN ROTATING ELECTRIC MACHINE AND SUPERCONDUCTING ROTATING ELECTRIC MACHINE WITH CRYOGEN SUPPLY AND RETURN DEVICE

(75) Inventors: Katsuya Umemoto, Akashi (JP); Kiyoshi Aizawa, Kobe (JP); Minoru Yokoyama, Abiko (JP); Satoru Takao, Akashi (JP); Kagao Okumura, Ebina (JP); Mitsugi Yamaguchi, Yokohama (JP); Yoshitsugu Gocho, Fujisawa (JP); Eiji Kosuge, Yamato (JP)

(73) Assignee: KAWASAKI JUKOGYO KABUSHIKI KAISHA, Kobe-Shi, Hyogo (JP)

( * ) Notice: Subject to any disclaimer, the term of this patent is extended or adjusted under 35 U.S.C. 154(b) by 571 days.

(21) Appl. No.: 13/394,711

(22) PCT Filed: Sep. 15, 2010

(86) PCT No.: PCT/JP2010/065930
§ 371 (c)(1),
(2), (4) Date: Apr. 17, 2012

(87) PCT Pub. No.: WO2011/034085
PCT Pub. Date: Mar. 24, 2011

(65) Prior Publication Data
US 2012/0204580 A1 Aug. 16, 2012

(30) Foreign Application Priority Data
Sep. 16, 2009 (JP) ................... 2009-214511

(51) Int. Cl.
*F17C 13/00* (2006.01)
*H02K 55/04* (2006.01)

(52) U.S. Cl.
CPC ............. *H02K 55/04* (2013.01); *Y02E 40/625* (2013.01)

(58) Field of Classification Search
CPC ........ Y02E 40/625; H02K 55/04; H02K 55/00
(Continued)

(56) References Cited

U.S. PATENT DOCUMENTS 3,894,403 A * 7/1975 Longsworth .......... F25D 19/006
505/892
4,356,700 A * 11/1982 Eckels ...................... F17C 9/00
277/430

(Continued)

FOREIGN PATENT DOCUMENTS

CA    1 148 191 A    6/1983
CN    1388632 A      1/2003
(Continued)

OTHER PUBLICATIONS

CN1388632 Translation.*
(Continued)

*Primary Examiner* — Frantz Jules
*Assistant Examiner* — Brian King
(74) *Attorney, Agent, or Firm* — Oliff PLC (57) ABSTRACT

Provided is a cryogen supply and return apparatus and a superconducting rotating electric machine, comprising stationary and rotatable members arranged out of contact with each other, preventing an increase of maintenance cost or a temperature increase of the cryogen which would be caused by contacts of the members. A cylinder 20 has on its outer peripheral surface ring-like recesses or grooves regularly or irregularly spaced in the longitudinal direction or spiral recesses or grooves continuously or discontinuously extending in the peripheral direction, to resist helium gas flowing through a cylindrical space between the cylinder 20 and the
(Continued)

inner tube 14*b* of the second double tube member and, as a result, to control a leakage of the helium gas from the cylindrical space.

9 Claims, 5 Drawing Sheets

(58) Field of Classification Search
USPC .......................................................... 62/50.7
See application file for complete search history.

(56) References Cited

U.S. PATENT DOCUMENTS

| | | | |
|---|---|---|---|
| 4,448,042 A * | 5/1984 | Yamaguchi | F17C 9/02 |
| | | | 310/54 |
| 4,721,637 A * | 1/1988 | Suzuki et al. | 428/36.9 |
| 6,412,289 B1 * | 7/2002 | Laskaris et al. | 62/50.7 |
| 2007/0220904 A1 * | 9/2007 | Jibb et al. | 62/50.7 |

FOREIGN PATENT DOCUMENTS

| | | |
|---|---|---|
| JP | A-54-086713 | 7/1979 |
| JP | A-57-181990 | 11/1982 |
| JP | B2-4064721 | 3/2008 |

OTHER PUBLICATIONS

Apr. 11, 2012 International Preliminary Report on Patentability submitted in International Application No. PCT/JP2010/065930.
Dec. 7, 2010 International Search Report issued in International Patent Application No. PCT/JP2010/065930 (with translation).
Apr. 15, 2014 Office Action issued in Chinese Patent Application No. 201080041362.5 (with translation).

* cited by examiner

CRYOGEN SUPPLY AND RETURN DEVICE FOR USE WITH CRYOGEN ROTATING ELECTRIC MACHINE AND SUPERCONDUCTING ROTATING ELECTRIC MACHINE WITH CRYOGEN SUPPLY AND RETURN DEVICE

FIELD OF THE INVENTION

The present invention relates to a cryogen supply and return device for a superconducting rotating electric device and a superconducting rotating electric machine with the cryogen supply and return device disposed between the superconducting rotating electric machine and a refrigerator for supplying the cryogen to the superconducting rotating electric machine to cool and maintain a superconducting property of superconducting coils in the superconducting rotating electric machine and returning the cryogen from the superconducting rotating electric machine to the refrigerator.

Conventionally, there has been disclosed in JP 4064721 (B), in particular in FIG. 9 thereof, a cryogen supply and return device for cooling the superconducting coils of the superconducting rotating electric machine down to a certain temperature to maintain the superconducting property of the coils. The device comprises a joint or coupling provided between a rotor of the superconducting rotating electric machine and a supply source for supplying an extremely cold cryogen such as helium gas, for supplying the cryogen to the superconducting rotating electric machine.

The joint comprises an entrance cooling tube and an exit cooling tube arranged in the rotor about a longitudinal axis of the rotor. The entrance cooling tube has an entrance port fluidly connected to the extremely cold cryogen supply source for receiving cooling gas from the supply source. The exit cooling tube has an exit port fluidly connected for returning the cooling gas from the rotor to the supply source. The entrance and exit ports are separated form each other by a fixed seal to prevent a leakage of the entering cooling gas which would otherwise flow toward a low pressure zone of the return gas and avoid a waste of the cooling power supplied from the supply source.

The cryogen supply and return device in JP 4064721 (B) comprises a stationary seal mounted on the stationary member and a rotating seal mounted on the rotating member to prevent the leakage of the entering cooing medium. This structure may cause frictional contacts between the stationary and the rotating seals during the rotation of the rotor, which deteriorates durability of the seals and thereby increases the maintenance cost of the device.

Also, heat caused by the frictional contacts of the stationary and the rotating seals may increase a temperature of the cooling gas.

Therefore, the present invention is to overcome the above problems and an object of the invention is to minimize a leakage amount of the entering cooling gas and to prevent the contacts between the stationary and the rotating members, thereby providing a cryogen supply and return device for the superconducting rotating electric machine and a superconducting rotating electric machine with the cryogen supply and return device, capable of preventing an increase of the maintenance cost which would otherwise be caused by the contacts between the stationary and the rotating members and a temperature increase of the cooling gas.

SUMMARY OF THE INVENTION

A cryogen supply and return apparatus for supplying a cryogen from a refrigerator to a superconducting rotating electric machine and returning the cryogen from the superconducting rotating electric machine to the refrigerator in order to cool superconducting coils in the superconducting rotating electric machine and maintain a superconducting property of the cooling superconducting coils comprises an unrotatably supported stationary tube and a rotatable tube which rotates with rotations of the superconducting rotating electric machine. The stationary tube is arranged inside or outside the rotatable tube to define a cryogen passage by connecting interiors of the stationary and rotatable tubes and a cylindrical gap extending continuously in a peripheral direction between the stationary and rotatable tubes. An outer surface portion of the stationary tube opposing the rotatable tube or an outer surface portion of the rotatable tube opposing the stationary tube has recesses extending in a peripheral direction thereof.

Also, a cryogen supply and return apparatus for supplying a cryogen from a refrigerator to a superconducting rotating electric machine and returning the cryogen from the superconducting rotating electric machine to the refrigerator in order to cool superconducting coils in the superconducting rotating electric machine and maintain a superconducting property of the cooling superconducting coils comprises an unrotatably supported stationary tube and a rotatable tube which rotates with rotations of the superconducting rotating electric machine. The stationary tube is arranged inside the rotatable tube to define a cryogen passage by connecting interiors of the stationary and rotatable tubes and a cylindrical gap extending continuously in a peripheral direction between the stationary and rotatable tubes. A distal end of the stationary tube has a tapered portion and a reducer, the reducer having a central reduced diameter portion and tapered and inversely tapered portions on opposite sides of the central reduced diameter portion, the reducer being arranged adjacent and partially overlapped with the distal end to form an opening connecting between interior and exterior of the stationary tube.

Further, a cryogen supply and return apparatus for supplying a cryogen from a refrigerator to a superconducting rotating electric machine and returning the cryogen from the superconducting rotating electric machine to the refrigerator in order to cool superconducting coils in the superconducting rotating electric machine and maintain a superconducting property of the cooling superconducting coils comprises an unrotatably supported stationary tube and a rotatable tube which rotates with rotations of the superconducting rotating electric machine. The stationary tube is arranged inside the rotatable tube to define a cryogen passage by connecting interiors of the stationary and rotatable tubes and a cylindrical gap extending continuously in a peripheral direction between the stationary and rotatable tubes. A distal end of the stationary tube has a reducer nozzle, the nozzle having a tapered portion tapered toward a downstream side, an inversely tapered portion provided on the downstream side of the tapered portion and inversely tapered toward the downstream side, a reduced diameter portion between the tapered and inversely tapered portions, and an aperture formed therein to fluidly connect between inside and outside of the stationary tube.

Furthermore, a cryogen supply and return apparatus for supplying a cryogen from a refrigerator to a superconducting rotating electric machine and returning the cryogen from the superconducting rotating electric machine to the refrigerator in order to cool superconducting coils in the superconducting rotating electric machine and maintain a superconducting property of the cooling superconducting coils comprises an unrotatably supported stationary tube and a rotatable tube which rotates with rotations of the superconducting rotating electric machine. The stationary tube is arranged inside or outside the rotatable tube to define a cryogen passage by connecting interiors of the stationary and rotatable tubes. When assumed that one of the stationary and rotatable tubes arranged inside the other being an inner tube and the other of the stationary and rotatable tubes arranged outside the inner tube being an outer tube, a length L of a portion of the inner tube inserted in the outer tube and a diameter D of the inner tube have L have a relation L≥5 D and a circular gap between the inner and outer tubes is 1/100 to 2/100 of an inner diameter of the inner tube.

According to the invention, a leakage amount of the cryogen is minimized. Also, because no contact occurs between the stationary and rotatable members, a maintenance cost increase or a temperature increase due to contacts between the stationary and rotatable members is eliminated.

DETAILED DESCRIPTION OF THE PREFERRED EMBODIMENTS

Referring to the accompanying drawings, a cryogen supply and return device for use with a superconducting rotating electric machine will be described below. In the following descriptions, terms "proximal", "distal", and other languages including those terms are used for the better understanding of the invention and the scope of the claims should not be limited by the terms.

Also, a position adjacent a refrigerator is referred to as "proximal" or "proximal side" and a position adjacent a superconducting motor is referred to as "distal" or "distal side".

Figure 1:
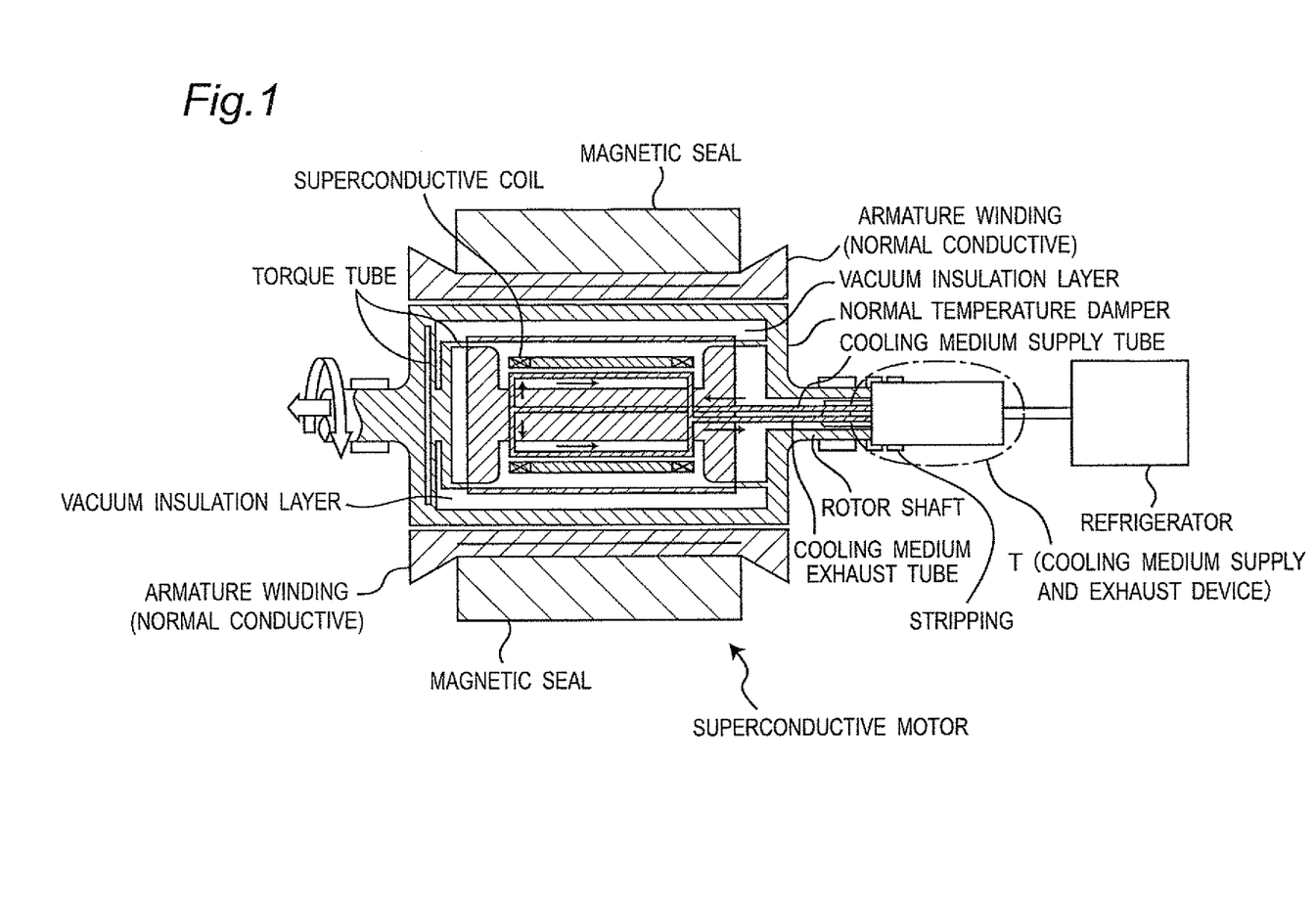
FIG. 1 is a schematic diagram showing an entire system of a superconducting motor.
Figure 2:
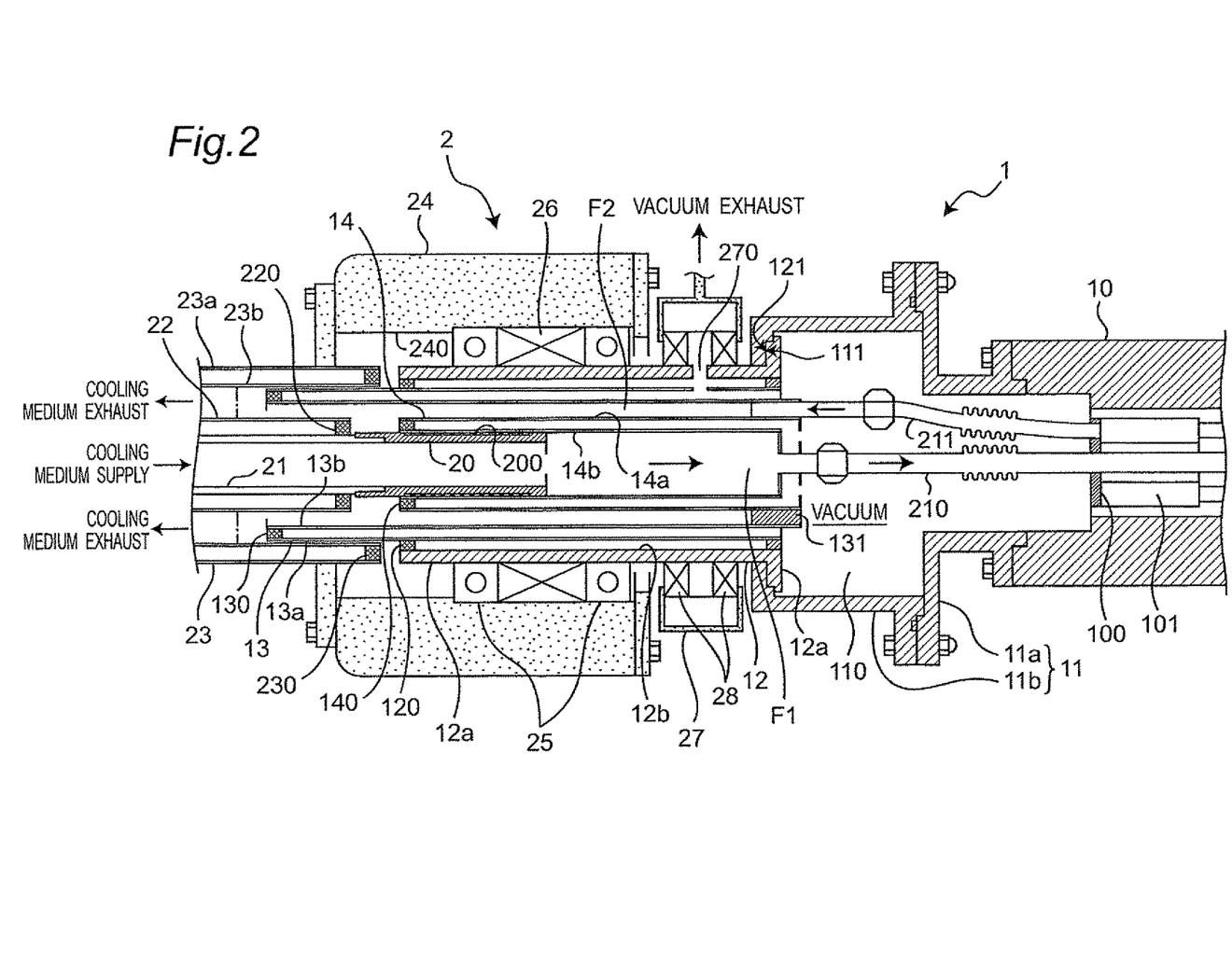
FIG. 2 is a longitudinal cross sectional view showing a detailed structure of a cryogen supply and return device according to an embodiment of the invention.

FIG. 1 is a diagram schematically showing an overall structure of the superconducting rotating electric machine and FIG. 2 is a longitudinal cross sectional view showing a detailed structure of the cryogen supply and return device according to the embodiment of the invention.

1. Structure of Cryogen Supply and Return Device

As shown in FIG. 1, the cryogen supply and return device T according to the embodiment of the invention is disposed between a rotor shaft of the superconducting motor and a refrigerator, for supplying extremely cold cryogen cooled down to a certain temperature by the refrigerator through a cryogen supply tube into a rotor core where the cryogen cools the entire rotor core and also, by the conduction cooling, superconducting coils down to about 30K, and returning the cryogen to the refrigerator through a cryogen return tube. In the embodiment helium gas is used for the cryogen and is used in the following descriptions instead of "cryogen" as necessary.

Next, detailed descriptions will be made to a structure of the cryogen supply and return device T according to the embodiment. As shown in FIG. 2 in which, unlike FIG. 1, the right left side thereof indicates a portion adjacent to the superconducting motor and the left side shows a portion adjacent to the refrigerator, the cryogen supply and return device T comprises a rotor station 1 and a stationary station 2.

The rotor station 1 comprises a motor shaft 10, a coupling 11, and a rotating shaft 12, disposed in series on a longitudinal axis. The rotating shaft 12 receives therein a first and second double tube members 13 and 14 disposed therein.

The motor shaft 10 is made of substantially a hollow cylindrical tube extending toward the superconducting motor along the longitudinal axis. The motor shaft 10 has a central cavity in which a cryogen supply tube and a cryogen return tube (illustrated in part in the drawing) are provided to extend along the supply tube. The supply and return tubes are fluidly connected to the rotor core of the superconducting motor (not shown in FIG. 2). The cryogen return tube supports at its proximal end a ring-like return header 101 fixed to a plate 100, the header 101 being fluidly connected to the return passage (which will be described below) through a flexible hose 211 so that the heat exchanged helium gas from the superconducting motor is collected in the header 101 and then fed into the return passage through the flexible hose 211.

The coupling 11 comprises a distal hollow cylindrical portion 11a connecting between small and large outward flanges and a proximal cylindrical portion 11b connecting between outward and inward flanges. The large outward flange of the distal hollow cylindrical portion 11a and the outward flange of the proximal hollow cylindrical portion 11b have the same outer diameter. The radially extending distal end surface of the inward flange of the proximal hollow cylindrical portion 11b defines a step 111.

As shown in FIG. 2, the small outward flange of the distal hollow cylindrical portion 11a is securely connected with the proximal end of the motor shaft 10 by fixing means such as bolts. The large outward flange of the distal hollow cylindrical portion 11a is securely connected with the outward flange of the proximal hollow cylindrical portion 11b by fixing means such as bolts. The cylindrical rotating shaft 12 is extended from the interior of the coupling 11 toward the refrigerator.

The cylindrical rotating shaft 12 comprises a flange 12a having a step 121 defined by a radially outwardly extending proximal end surface. The rotating shaft 12 is securely connected to the coupling 11 with the steps 111 and 121 engaged with each other and supported for rotation by the bearings 25 of the stationary station 2.

Provided inside the rotating shaft 2 are the first double tube member 13 made of coaxially arranged outer and inner tubes 13a and 13b and the second double tube member 14 made of coaxially arranged outer and inner tubes 14*a* and 14*b* to define a cylindrical cavity between the first and second double tube members 13 and 14.

As illustrated in the drawings, a cylindrical cavity defined between the inner peripheral surface 12*b* of the rotating shaft 12 and the outer tube 13*a* of the first double tube member 13 is sealed by a closure 120. A proximal end of the channel defined in the double tube member 13 is closed by a closure 130 and a distal end of the channel is opened to the chamber 110.

A cylindrical channel defined between the inner tube 13*b* of the double tube member 13 and the outer tube 14*a* of the second double tube member 14 is opened at its proximal end and closed at its distal end by a cylindrical closure 131. A flexible hose 211 is connected into the cylindrical channel through the closure 131 so that the cylindrical channel functions as a helium gas return passage F2 which is connected through the flexible hose 211 to the ring-like return header 101.

The second double tube member 14 is closed at its proximal end by a circular closure 140. The distal end of the inner tube 14*b* is closed and an interior of the inner tube 14*b* is connected to the flexible hose 210. This results in that the interior of the inner tube 14*b* of the second double tube member 14 functions as a helium gas supply passage F1 which is connected to the helium gas supply source.

As illustrated in the drawing, the rotating shaft 12 and the first double-tube member 13 have exhaust ports 270 fluidly connected to a vacuum exhaust device not shown, forming circular vacuum insulating channels defined between the inner peripheral surface 12*b* of the rotational shaft 12 and the outer peripheral surface of the first double tube member 13 and between the outer and inner tubes 13*a* and 13*b* of the first double tube member 13. This allows that a vacuum is produced in the chamber 110 fluidly connected with the exhaust ports 270 and the circular channel between the outer and inner tubes 14*a* and 14*b* of the second double tube member 14.

Discussions will be made to the stationary station 2. As shown in FIG. 2, the stationary station 2 remains stationary with respect to the rotor station 1 and comprises a cylinder 20, a cryogen supply tube 21, an outer tube 22, a double tube member 23, a casing 24, bearings 25, a magnetic fluid sealing mechanism 26, an exhaust chamber 27, and a magnetic fluid sealing mechanism 28 provided within the exhaust chamber 27, coaxially disposed with each other.

The cylinder 20 has a diameter slightly smaller than the inner diameter of the second double tube member 14. For example, the cylinder 20 is designed to form a cylindrical gap having a thickness of about 0.1 millimeter between the cylinder 20 and the inner tube 14*b* of the second double tube member 14 when the cylinder 20 is inserted inside and overlapped with the second double tube member 14. The outer surface of the cylinder 20 has a number of ring-like peripheral groves 200 at a regular interval in the longitudinal direction. The grooves 200 may be arranged at irregular intervals in the longitudinal direction.

Figure 3:
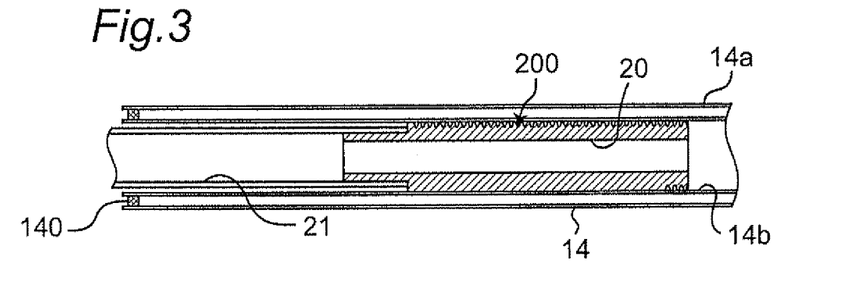
FIG. 3 is a longitudinal cross sectional view of an embodiment in which a cylinder is inserted in the cryogen supply tube.

Preferably, the cylinder 20 is made of ultrahigh molecular weight polyethylene fiber commercially available under the trade-name, for example, Dyneema or Spectra (Honeywell). Each of those fibers has elevated mechanical strength and thermal conductivity and is capable of being provided with a negative linear coefficient expansion by adjusting an angle of filament winding in the manufacturing process. This ensures that the cylinder 20 expands in the longitudinal direction due to the cooling effect of helium gas, which prevents the cylinder 20 from dropping out of the inner tube 14*b* of the second double tube member 14 even where the cylinder 20 is inserted inside the tube 14*b* as shown in FIG. 3.

Although in this embodiment the cylinder 20 is provided at the distal end of the cryogen supply tube 21 of the stationary station 2, this is not restrictive and, alternatively, it may be provided at the proximal end of the double tube member 14. Alternatively, it may be provided at the proximal end of the first double tube member in the rotor station 1 or at the distal end of the second double tube member in the stationary station 2.

The cryogen supply tube 21 is fluidly connected to the cylinder 20 to form a helium gas supply passage from the helium gas supply not shown to the superconducting motor.

The outer tube 22 is disposed around the cryogen supply tube 21 to leave a cylindrical space therebetween which is sealed at its distal end by a cylindrical member 220. The double tube member 23 made of outer and inner tubes 23*a* and 23*b* is arranged around the outer tube 22 to leave a cylindrical space therebetween which is sealed at its distal end by a cylindrical member 230.

As shown in the drawing, the double tube member 23 is arranged around and overlapped with the first double tube member 13. Although not described in detail, the cylindrical spaces between the outer peripheral surface of the cryogen supply tube 21 and the inner peripheral surface of the outer tube 22 and between the outer and inner tubes 23*a* and 23*b* of the double tube member 23 are used as vacuum insulation layers.

The casing 24 is fixed to the outer tube 23*a* of the double tube member 23 and incorporates the rotating shaft 12 supported by two bearings 25 for rotation relative to the casing 24 and the magnetic fluid sealing mechanism sealing a cylindrical clearance between the rotating shaft 12 and the casing 24. The exhaust chamber 27 comprises the magnetic fluid sealing mechanism 28 for sealing the exhaust chamber 270 around the rotational shaft 12. In the meantime, a peripheral speed of the rotational shaft 12 of the rotor station 1 is designed so that no oil in the magnetic fluid would dissipate by the internal heat generated due to viscosity in the magnetic fluid.

2. Operation of Cryogen Supply and Return Device

Referring to FIG. 2, operations of the cryogen supply and return device of the embodiment will be described.

As shown in FIG. 2, the helium gas cooled down to a predetermined extremely low temperature by the refrigerator not shown flows from the left side in the drawing through the cryogen supply tube 21, the cylinder 20, the supply passage F1, and the flexible hose 210 into the interior of the motor shaft 10.

Then, the helium gas is fed into the superconducting motor not shown disposed on the right side of the device shown in FIG. 2 to cool the entire rotor core disposed in the superconducting motor and then the superconducting coils supported on the rotor core down to a temperature of about 30K for maintaining the superconducting property of the superconducting coils.

The helium gas heat-exchanged at the cooling of the superconducting coils is transported back into the motor shaft 10 and collected in the exhaust header 101. Then, the collected helium gas is transported through the flexible hose 211, the passage F2, and the cylindrical channel defined between the outer peripheral surface of the outer tube 22 and the inner tube 23*b* of the double tube member 23 toward the refrigerator.

According to the cryogen supply and return device T of the embodiment, by the arrangement provided in the cylinder 20 an amount of helium gas leaking from the cylindrical channel between the cylinder 20 and the inner tube 14b of the second double tube member 14 is restricted during the rotation of the second double tube member 14 of the rotor station 1.

Also, the cryogen supply and return device T of the embodiment avoids a maintenance cost increase and a temperature increase of the cryogen which is caused by the contacts between the seal members of the rotor and stationary stations in the conventional structure.

Also, according to the cryogen supply and return device T of the embodiment, the rotor and stationary stations 1 and 2 are partially overlapped in the longitudinal direction, which renders the structure of the cryogen supply and return device more simple and compact.

3. Variations of Cylinder

The cylinder 20 may be made of polyethylene fiber reinforced plastic, for example, other than Dyneema or Spectra (Honeywell). Alternatively, the cylinder 20 may be made of polytetrafluoroethylene including organic filling material. In this instance, no cold brittle fracture would occur in the cylinder 20. Further, even if the inner tube 14b of the second double tube member 14 is machined with minus dimensional tolerance, the cylinder 20 fits well with the inner tube 14b. Furthermore, no adverse affect would be caused in the cooling of the superconducting coils by the contacts between the outer surface of the cylinder 20 and the inner surface of the inner tube 14.

Also, the ring-like grooves 200 on the cylinder 20 are partially filled with polytetrafluoroethylene so that the remaining grooves align at a regular interval.

Further, the grooves may be formed by spiral grooves extending continuously or discontinuously in the longitudinal direction. The spiral grooves may be designed in a manner such that air in the grooves is forced out into the supply passage F1 by the rotation of the second double tube member 14.

The peripheral grooves on the outer surface of the cylinder 20 may have a rectangular cross section with its width greater than its height provided that the above-described advantages can be obtained. The grooves may be distributed non-uniformly on the outer peripheral surface of the cylinder 20. Various modifications can be made to the groove. For example, the grooves may be formed obliquely with respect to the longitudinal axis.

Figure 6:
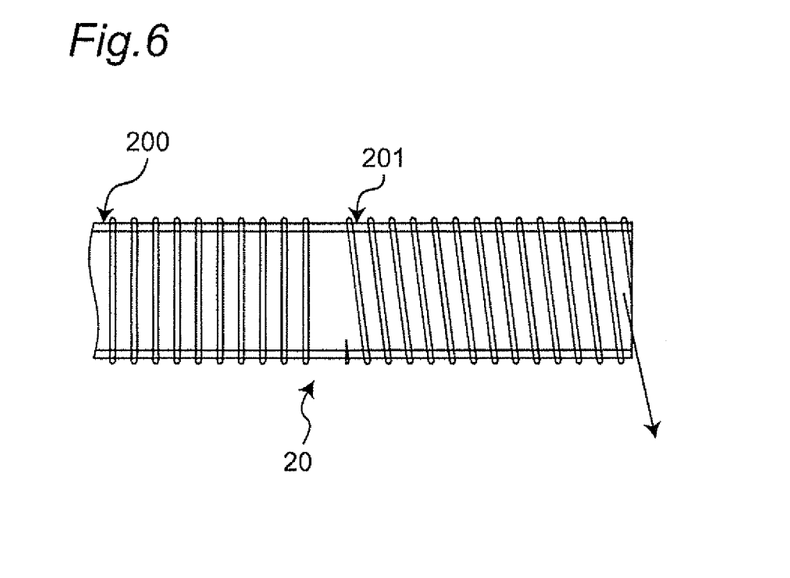
FIG. 6 is a side elevation of the cylinder with two different grooves.

Also, as shown in FIG. 6, the cylinder 20 may be formed with the regularly spaced ring-like grooves 200 on its proximal region and a spiral groove 201 on its distal region for forcing air remaining in the grooves back into the supply passage not shown.

Although regularly- or irregularly-spaced ring-like recesses or grooves or continuous or discontinuous spiral recesses or grooves are formed on the outer peripheral surface of the cylinder 20 in order to control an amount of helium gas leaking through the circular space between the outer peripheral surface of the cylinder and the inner tube 14b of the second double tube member 14, the present invention is not limited to those embodiments. For example, the recesses may be formed on the inner tube 14b of the double tube member 14 opposing the cylinder 20. Alternatively, the recesses may be formed on the outer peripheral surface of the double tube member 23 of the stationary station 2, opposing the first double tube member 13 of the rotor station 1 or on the outer peripheral surface of the double tube member 13, opposing the double tube member 23.

4. Other Embodiments of Cryogen Supply and Return Device without Cylinder

Although each of the cryogen supply and return devices described in the previous embodiments comprises the cylinder 20, an object of the invention may be attained without using the cylinder 20. Specific embodiments thereof will be described with reference to FIGS. 4, 5, and 7.

Figure 4:
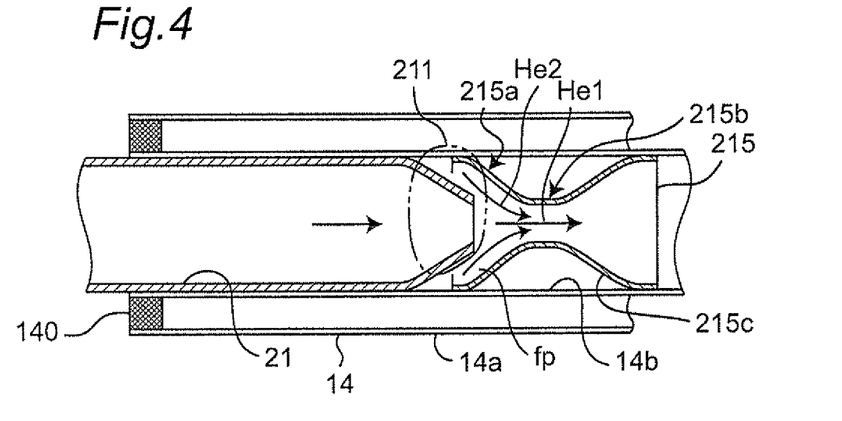
FIG. 4 is a longitudinal cross sectional view of an embodiment of the cryogen supply and return device in which a distal end of the cryogen supply tube is tapered and a member tapered and inversely tapered at opposite ends thereof is arranged in front of the distal end of the supply tube.

As shown in FIG. 4, the cryogen supply tube 21 in the stationary station 2 may be designed to have an outer diameter which is slightly smaller than an inner diameter of the second double tube 14 in the rotor station 1 and a tapered portion at its distal end. The tapered portion 211 of the cryogen supply tube 21 is inserted in the inner tube 14b of the second double tube member 14. A reducer 215 is provided which comprises a central reduced diameter portion 215b and portions 215a and 215c inversely-tapered away from the central reduced diameter portion 215b. The reducer 215 is secured to the inner tube 14b of the second double tube member 14 in a manner such that one of its inversely-tapered portions is partially overlapped with the distal end of the tapered portion 211.

With the arrangement, the helium gas is ejected at high speed from the tapered portion 211 of the cryogen supply tube 21, which produces a lower pressure zone in the passage fp between the tapered portion 211 and the reducer 215. This results in that the helium gas between the inner tube 14b of the double tube member 14 and the reducer 215 is sucked into the passage fp, and then the helium gas He2 in the passage fp is accompanied by the helium gas He1. Consequently, the helium gas which would otherwise leak through the cylindrical space is transported to the motor and thereby a leakage amount of helium gas is minimized. Preferably, the inner diameter of the tapered portion 211 of the cryogen supply tube 21 is the same as the inner diameter of the reduced portion 215b of the reducer 215. Tests conducted by the inventors showed that the leakage amount was reduced less than about 10% when the inner diameters of the tapered portion 211 and the reduced portion 215 was reduced to 40% of the inner diameter of the cryogen supply tube 21 and the gap between the tapered portion 211 and the inversely tapered portion 215a was set to be 10% of the inner diameter of the reduced portion 215b.

Figure 5:
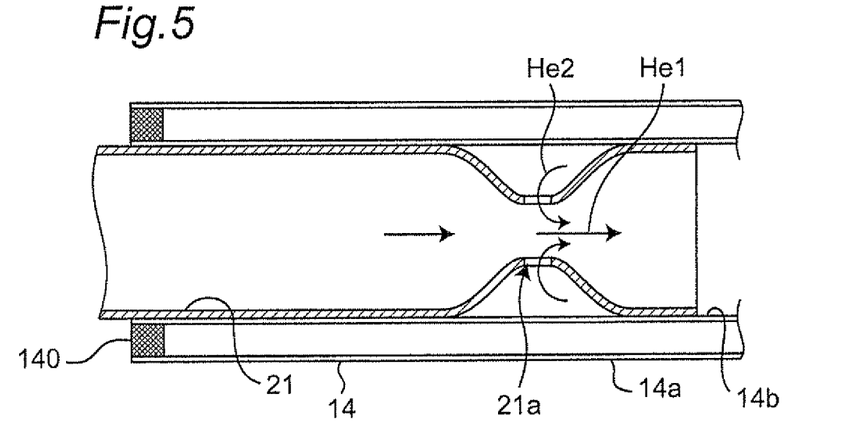
FIG. 5 is a longitudinal cross sectional view of an embodiment of the cryogen supply and return device which comprises a reduced diameter portion of the cryogen supply tube and apertures defined in the reduced diameter portion.

As shown in FIG. 5, the cryogen supply tube 21 may be formed with a reducer nozzle portion having a first portion tapered toward the downstream side, a second portion inversely-tapered toward the downstream side and positioned on the downstream side of the first portion, and a plurality of apertures 21a spaced at intervals in the peripheral direction. A total area of the apertures which is determined by the diameters and the number of the apertures is designed to be 20-40% of a surface area of the cylindrical portion between the cryogen supply tube 21 and the inner tube 14b of the second double tube 14.

According to the arrangement, the helium gas He2 ejected at high speed from the tapered portion produces a vacuum in the space around the reduced diameter portion, which causes a circulation of the helium gas He2 along which the helium gas is sucked through the cylindrical space between the cryogen supply tube 21 and the inner tube 14b of the second double tube member 14 and the cylindrical space around the reduced diameter portion into the apertures 21a. Consequently, similar to the cryogen supply and return device T shown in FIG. 4, the helium gas is securely supplied to the motor with a minimum leakage of the helium gas.

Figure 7:
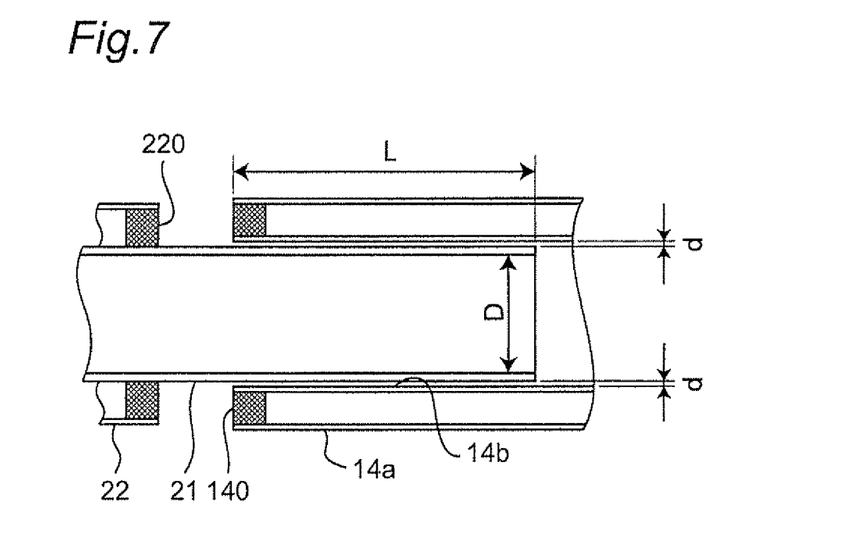
FIG. 7 is a diagram showing another embodiment of the cryogen supply and return device which controls a leakage of helium gas without using the cylinder.
Figure 8:
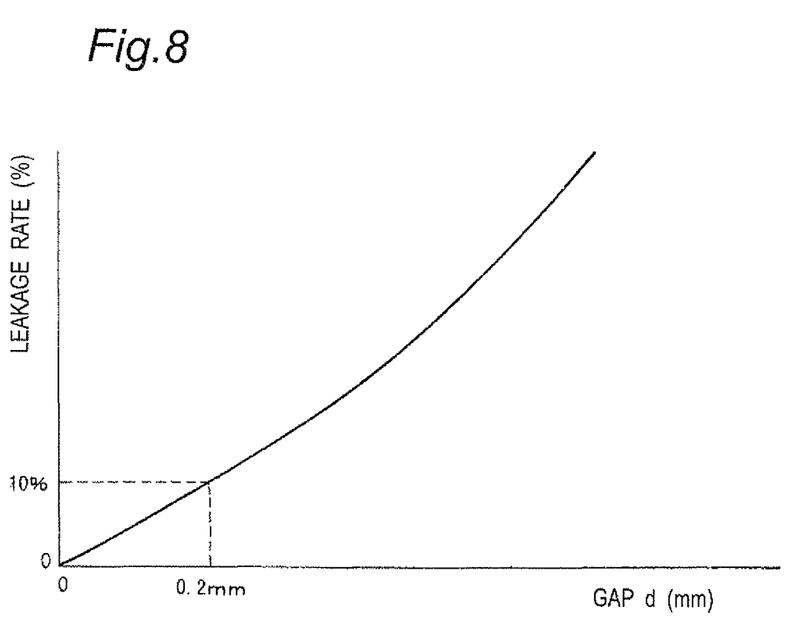
FIG. 8 is a graph showing a relation between an amount of leakage and a gap of 0.1 to 0.2 millimeters between the cryogen supply tube and the inner tube of the second double tube member.

The leakage of the helium gas can be reduced to about 10% by, as shown in FIG. 7, inserting the cryogen supply tube 21 into the inner tube 14b of the second double tube member 14 and adjusting a gap (d) between the outer surface of the cryogen supply tube 21 and the inner surface of the inner tube 14b of the second double tube member 14. Specifically, an insert length L and a diameter D of the cryogen supply tube 21 are designed so that L is equal to or more than 5 D (L≥5 D) and the gap (d) is 1/100 to 2/100 of the inner diameter of the cryogen supply tube. Preferably, the gap (d) is 2/100 of the inner diameter of the supply tube 21. FIG. 8 shows a test result, which illustrates a relation between the gap (d) and the leakage amount where the inner diameter of the inner tube 14b of the second double tube member 14 was 20 millimeters. This result clearly shows that the leakage is reduced to about 10% when the gap (d) is 0.2 millimeters. Also the tests showed that, according to the embodiments, the same results were attained when the supply tube 21 in the stationary station 2 was arranged around the second double tube member 14 of the rotor station 1.

The above described embodiments are simply examples and not restrictive to the invention. The invention is intended to cover not only the subject matter defined in the claims but also the equivalents thereof.

What is claimed is:

1. A cryogen supply and return apparatus for supplying a cryogen from a refrigerator to a superconducting rotating electric machine and returning the cryogen from the superconducting rotating electric machine to the refrigerator in order to cool superconducting coils in the superconducting rotating electric machine and maintain a superconducting property of the superconducting coils, the refrigerator having a cylindrical casing and the superconducting rotating electric machine having a cylindrical shaft and coupling, the cylindrical shaft and coupling of the superconducting rotating electric machine being inserted coaxially in the cylindrical casing of the refrigerator so that the cylindrical shaft and coupling are capable of rotating about a longitudinal axis of the superconducting rotating electric machine, the cryogen supply and return apparatus comprising:
   a first tube that is positioned along the longitudinal axis within the cylindrical casing of the refrigerator and fixedly supported by the refrigerator;
   a second tube that is positioned along the longitudinal axis and connected at one end thereof with a cryogen supply tube provided within the cylindrical shaft and coupling of the superconducting rotating electric machine and fixedly supported by the superconducting electric machine so that the second tube rotates with rotations of the superconducting rotating electric machine, the first tube and the second tube being assembled with each other so that either (i) the first tube is inserted inside an other end of the second tube, or (ii) the other end of the second tube is inserted inside the first tube to define a first cryogen passage for supplying the cryogen from the refrigerator toward the superconducting rotating electric machine, and a gap between the first tube and the second tube;
   a third tube that is positioned along the longitudinal axis and around the second tube, within the cylindrical casing of the refrigerator, and fixedly supported by the superconducting rotating electric machine so that the third tube rotates with rotation of the superconducting electric machine and defines a second cryogen passage around the first tube and the second tube for returning the cryogen from the superconducting rotating electric machine toward the refrigerator, the second cryogen passage being connected with a cryogen return tube provided within the cylindrical shaft and coupling of the superconducting rotation electric machine;
   a fourth tube that is positioned along the longitudinal axis and around the third tube and fixedly supported by the superconducting rotating electric machine so that the fourth tube rotates with rotations of the superconducting rotation electric machine and defines a closed cylindrical space around the third tube, the fourth tube having a first port defined therein, the first port being configured to communicate with a vacuum exhaust device, the fourth tube being connected with the cylindrical shaft and coupling of the superconducting rotating electric machine to define a cylindrical chamber inside the cylindrical shaft and coupling of the superconducting rotation electric machine for receiving the cryogen supply and return tubes;
   an exhaust chamber that is fixedly supported by the refrigerator so that the exhaust chamber surrounds the fourth tube in a direction perpendicular to the longitudinal axis to fluidly communicate between the vacuum exhaust device and the first port; and
   a sealing mechanism that seals between the exhaust chamber and the fourth tube, wherein:
      one of the first tube and the second tube has peripheral recesses defined on an outer peripheral surface thereof opposing the other of the first tube and the second tube,
      the second tube is a double tube structure having a first inner tube portion, a first outer tube portion, and a first annular channel defined between the first inner tube portion and the first outer tube portion,
      the third tube is a double tube structure having a second inner tube portion, a second outer tube portion, and a second annular channel defined between the second inner tube portion and the second outer tube portion,
      the first annular channel and the second annular channel are sealed at ends disposed away from the superconducting rotating electric machine and opened to the cylindrical chamber defined in the superconducting rotating electric machine, and
      the second annular channel has a second port that is configured to be fluidly connected through the first port with the vacuum exhaust device and a third port that is configured to be fluidly connected with the cylindrical chamber so that a vacuum is produced in the first annular channel, the second annular channel and the cylindrical chamber.

2. The apparatus of claim 1, wherein the recesses are grooves wrapping completely around the inserted first tube or the inserted second tube, and are regularly or irregularly spaced in a longitudinal direction.

3. The apparatus of claim 1, wherein the recesses are helical grooves continuously or discontinuously extending in a longitudinal direction.

4. The apparatus of claim 3, the grooves being designed so that, by rotations of the second tube, a fluid in the grooves is forced back into the interior of the second tube.

5. The apparatus of claim 1, wherein the recesses have ring-like recesses and spiral recesses arranged on one side of the ring-like recesses with respect to a longitudinal direction.

6. The apparatus of claim 1, wherein the recesses have a transverse rectangular cross section.

7. The apparatus of claim 1, wherein at least a part of an outer surface portion of the first tube opposing the second tube or an outer surface portion of the second tube opposing the first tube is made of ultrahigh molecular weight polyethylene fiber reinforced composite material with a negative linear coefficient expansion.

8. The apparatus of claim 1, wherein a diameter D and a length L of a portion of the first tube or the second tube inserted in the other tube have a relation L≥5D and a circular gap between the first tube and the second tube is 1/100 to 2/100 of an inner diameter of the first tube or the second tube inserted in the other tube.

9. A superconducting rotation electric machine having a stator and a rotor, electromagnetically connected with each other, comprising the cryogen supply and return apparatus of claim 1.

* * * * *